(No Model.)

J. H. WOODWARD.
ELECTRIC BELT.

No. 338,683. Patented Mar. 23, 1886.

WITNESSES
F. L. Durand
A. L. Morsell.

INVENTOR
James H. Woodward
by Louis Bagger & Co.
his Attorneys.

UNITED STATES PATENT OFFICE.

JAMES HARRISON WOODWARD, OF SEWARD, NEBRASKA.

ELECTRIC BELT.

SPECIFICATION forming part of Letters Patent No. 338,683, dated March 23, 1886.

Application filed December 23, 1885. Serial No. 186,534. (No model.)

*To all whom it may concern:*

Be it known that I, JAMES HARRISON WOODWARD, a citizen of the United States, and a resident of Seward, in the county of Seward and State of Nebraska, have invented certain new and useful Improvements in Electric Belts; and I do hereby declare that the following is a full, clear, and exact description of the invention, which will enable others skilled in the art to which it appertains to make and use the same, reference being had to the accompanying drawings, which form a part of this specification, and in which—

Figure 1:
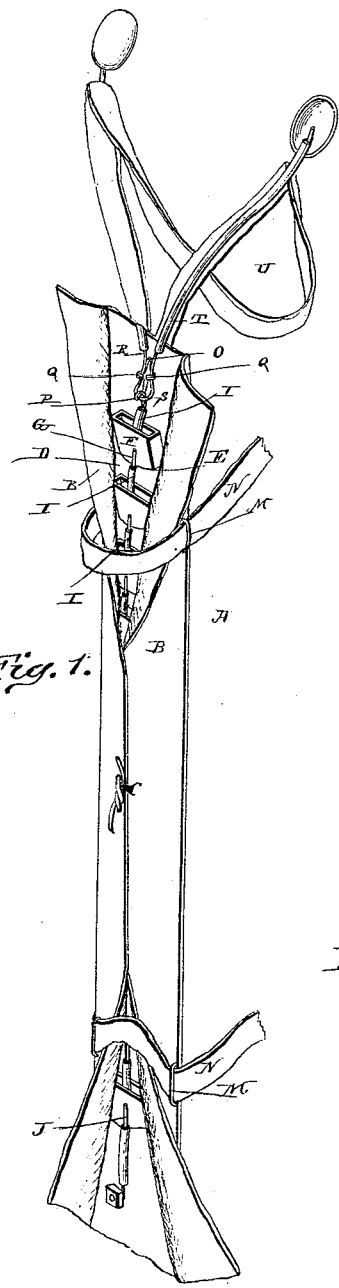
Figure 2:
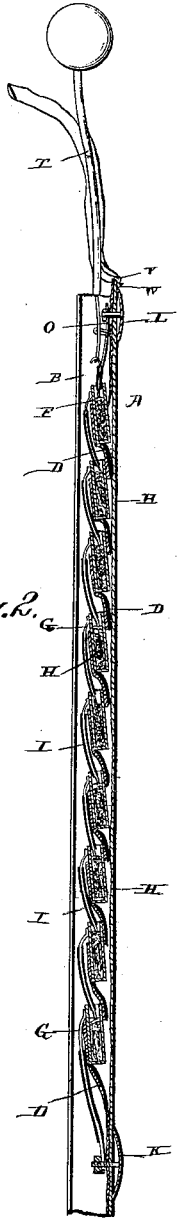
Figure 3:
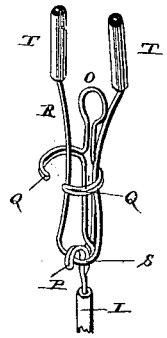

Figure 1 is a perspective view of my improved portable galvanic battery, showing the flaps covering the batteries unfastened and spread apart. Fig. 2 is a longitudinal sectional view of the same, and Fig. 3 is a perspective view of the fastening for the throat-electrodes.

Similar letters of reference indicate corresponding parts in all the figures.

My invention has relation to that class of portable galvanic batteries which are usually termed "galvanic belts," or batteries for local application upon the body; and it consists in the improved construction and combination of parts of a battery, which is so constructed that it may be used as a belt around the waist, along the spine, or upon the body and at both sides of the throat, as hereinafter more fully described and claimed.

In the accompanying drawings, the letter A indicates the main body or strip of the belt, which strip is either silk or oil-cloth, or of a similar non-conducting material, and which strip is provided at its side edges with flaps B B, which may overlap each other upon the outer side of the belt, and which may be secured together at their edges by means of lacing-cords C. A lining strip, D, is secured to the body-strip, and is provided with a number of transverse slits, E, into which the zinc cups F may fit, the said cups having the copper coils G, inserted into them and covered with the absorbent H, and the upper or outer ends of the copper coils are insulated by means of short pieces I of rubber tube and secured to the outer sides of the cups above them, near the upper edges of the same. In this manner the circuit is formed between the several cells or cups, and the cups are retained in the slits by the ends of the copper coils being secured to the sides of the cups, and thus hooking over the edges of the slits.

The copper wire J, secured to the lowermost cup, is secured at its free end to the shank of a button, K, which projects upon the inner side of the body-strip, and the upper end of the uppermost copper coil is secured in the same manner to the shank of a similar button, L.

The body-strip or the flanges are provided with loops M, into which elastic straps N may be inserted, which straps serve to secure the battery to the body, and these straps may be arranged differently, according to the different uses to which it may be desired to put the battery.

The uppermost copper coil is formed with a cross-shaped device of doubled wire, the upper end or loop, O, of which device is secured to the shank of the upper button, and the lower portion of the cross-shaped device is formed into a downwardly-pointing hook, P, while the branches Q Q are bent inward, forming hooks pointing toward each other.

A wire, R, is doubled to form a loop, S, at its lower doubled end, which loop may be inserted between the inwardly-pointing hooks and hooked upon the downwardly-pointing hook, and the remaining portions of the wire are covered by tubes T, of rubber, insulating them. The upper ends of the wire are formed with metallic buttons, and the free portions of the wires have elastic bands or straps secured to them, as shown at U, by means of which straps the wires may be adjusted to bear with their buttons against the sides of the throat, the attachment being intended to be used for applying electricity to the throat, the upper button being removed and the wire being attached with the buttons bearing against the throat, while the lower button may bear against any portion of the body. A hook, V, is secured to the wires near their lower doubled end, and this hook engages an eye, W, upon the inner side of the upper end of the body-strap, serving, together with the hook at the lower end of the cross-shaped fastening device, to secure the doubled wire.

It will be seen that the battery may be used as a belt, the throat attachment being removed, or as a spinal battery, being secured to rest with its buttons against the extreme ends of the spine, or the upper button may be removed, the said button having a threaded shank, which is provided with a nut, which clamps the looped upper end of the cross-shaped hooking device, so that to remove the button it is necessary to remove the nut and then withdraw the button.

When the button has been removed, the looped end of the doubled wire may be inserted between the inwardly-hooked branches of the cross-shaped device and the lower end of the loop hooked over the hook at the lower end of the device, and the buttons at the upper ends of the wire may now be applied to both sides of the throat, while the lower button, which is the other pole of the battery, may rest against any portion of the body.

Having thus described my invention, I claim and desire to secure by Letters Patent of the United States—

1. In a galvanic battery for local application upon the body, the combination of a lining-strip having a series of transverse slits with a number of cups having their inner ends inserted through the slits and having wires secured to their outer ends, hooking over the slits and connected with the adjoining cups, as and for the purpose shown and set forth.

2. In a galvanic battery for local application upon the body, the combination of a lining-strip having a series of transverse slits with a number of zinc cups inserted through the slits, and copper coils inserted with the absorbent into the cups and having their ends secured to the outer end of the adjoining cup, hooking over the edges of the slits, as and for the purpose shown and set forth.

3. In a galvanic battery for local applications upon the body, the combination of the body-strip having flaps at its edges and having elastic fastening-straps, a lining-strip secured to the body-strip and having a series of transverse slits, a number of battery cups or cells inserted into the slits and having the wire from one cup secured to the outer end of the adjoining cup, hooking over the edges of the cups, and buttons secured at the ends of the wires of the circuit by means of their shanks and projecting upon the inner sides of the ends of the body-strip, as and for the purpose shown and set forth.

4. In a galvanic battery for local application upon the body, the combination of the positive wire having its end doubled and bent into cross shape, having a hook at its lower end pointing downward and having the ends of the lateral branches bent inward to form retaining-hooks, with a wire having metallic buttons at its ends and bent double, to form a loop adapted to be inserted between the retaining-hooks and to be hooked upon the lower hook, as and for the purpose shown and set forth.

In testimony that I claim the foregoing as my own I have hereunto affixed my signature in presence of two witnesses.

JAMES HARRISON WOODWARD.

Witnesses:
JAMES BRINKERHOFF,
EDWARD B. CHASE.